US011958552B2

(12) United States Patent
Zhao et al.

(10) Patent No.: US 11,958,552 B2
(45) Date of Patent: Apr. 16, 2024

(54) BIONIC ROBOT FOR ALL TERRAINS

(71) Applicants: Inner Mongolia Su Meng Technology Power Equipment Co., Ltd., Inner Mongolia (CN); China University of Mining & Technology, Beijing, Beijing (CN)

(72) Inventors: Jianwei Zhao, Beijing (CN); Hai Zhang, Inner Mongolia (CN); Zhikang Chi, Beijing (CN); Haichao Zhang, Beijing (CN); Chaoyi Liu, Beijing (CN); Xiaofei Ma, Beijing (CN)

(73) Assignees: INNER MONGOLIA SU MENG TECHNOLOGY POWER EQUIPMENT CO., LTD., Ulanqab (CN); CHINA UNIVERSITY OF MINING & TECHNOLOGY, BEIJING, Beijing (CN)

( * ) Notice: Subject to any disclaimer, the term of this patent is extended or adjusted under 35 U.S.C. 154(b) by 602 days.

(21) Appl. No.: 17/084,167

(22) Filed: Oct. 29, 2020

(65) Prior Publication Data

US 2021/0122030 A1    Apr. 29, 2021

(30) Foreign Application Priority Data

Oct. 29, 2019    (CN) .......................... 201911038987.5

(51) Int. Cl.
*B62D 57/028*    (2006.01)
*B25J 9/10*    (2006.01)
(Continued)

(52) U.S. Cl.
CPC ............ *B62D 57/028* (2013.01); *B25J 9/104* (2013.01); *B25J 9/123* (2013.01); *B25J 9/1697* (2013.01);
(Continued)

(58) Field of Classification Search
CPC .................................................. B62D 57/028
See application file for complete search history.

(56) References Cited

U.S. PATENT DOCUMENTS

| 11,077,566 | B2 * | 8/2021 | Chernyak | ............ | B62D 57/028 |
| 2021/0276642 | A1 * | 9/2021 | Gillett | ............... | G05D 1/0891 |

FOREIGN PATENT DOCUMENTS

| CN | 101927497 B | * | 2/2012 |
| CN | 103661652 | | 3/2014 |

(Continued)

OTHER PUBLICATIONS

SIPO, First Office Action for CN Application No. 201911038987.5, dated Apr. 26, 2020.

(Continued)

*Primary Examiner* — Kevin Hurley
*Assistant Examiner* — Hosam Shabara
(74) *Attorney, Agent, or Firm* — Hodgson Russ LLP

(57) ABSTRACT

A bionic robot is provided, which includes a body; a plurality of sets of wheeled leg devices arranged at intervals in a front-rear direction, each comprising two wheeled leg devices arranged symmetrically in a left-right direction, each comprising a leg assembly and a travel wheel, and a power output shaft connected to the travel wheel; and a suspension device disposed in the body and connected to at least two sets from the plurality of sets of wheeled leg devices. The at least two sets of wheeled leg devices are located at the foremost end and the backmost end respectively. The suspension device comprises a plurality of drive assemblies, each connected to a corresponding leg assembly, which each comprise: an electric cylinder being configured to drive a telescopic rod to extend or retract; a damper connected between the body and the leg assembly; and an elastic member fitted over the damper.

5 Claims, 6 Drawing Sheets

(51) Int. Cl.
 *B25J 9/12* (2006.01)
 *B25J 9/16* (2006.01)
 *B25J 13/00* (2006.01)
 *B25J 13/08* (2006.01)
 *B25J 19/00* (2006.01)

(52) U.S. Cl.
 CPC ........... *B25J 13/006* (2013.01); *B25J 13/089* (2013.01); *B25J 19/0091* (2013.01)

(56) References Cited

FOREIGN PATENT DOCUMENTS

| CN | 103661652 A | * | 3/2014 | |
|---|---|---|---|---|
| CN | 105035204 | | 11/2015 | |
| CN | 105035204 A | * | 11/2015 | |
| CN | 105235467 | | 1/2016 | |
| CN | 105235467 A | * | 1/2016 | ........... G05D 1/0692 |
| CN | 107340777 | | 11/2017 | |
| CN | 107340777 A | * | 11/2017 | ........... G05D 1/0692 |
| CN | 110126562 A | * | 8/2019 | ................ B60F 5/02 |
| KR | 20200102473 A | * | 8/2020 | |

OTHER PUBLICATIONS

SIPO, Second Office Action for CN Application No. 201911038987.5, dated Sep. 23, 2020.

* cited by examiner

BIONIC ROBOT FOR ALL TERRAINS

CROSS-REFERENCE TO RELATED APPLICATION

This application claims priority to Chinese Patent Application Serial No. 201911038987.5, filed on Oct. 29, 2019, the entire disclosure of which is incorporated herein by reference.

FIELD

The present disclosure relates to the field of robots, and more particularly to a bionic robot for all terrains.

BACKGROUND

At present, all-terrain robots mainly include wheeled robots, tracked robots, legged robots, compounding robots (such as including wheels and tracks, etc.) and bionic robots (such as snake-like robots, etc.). In the related art, the wheeled robots are not suitable for walking on complex terrains and have poor obstacle-crossing ability and poor adaptability; the legged robots have complex structure and control, poor stability, and low walking speed and efficiency; the tracked robots have large frictional resistance and losses and are prone to abrasion by soil; and the bionic robots have poor motion stability and loading capacity.

SUMMARY

The present disclosure aims to solve at least one of the technical problems in the related art.

To this end, the present disclosure provides a bionic robot for all terrains, which has a strong obstacle-crossing ability and good motion stability.

According to embodiments of the present disclosure, the bionic robot for all terrains includes: a body; a plurality of sets of wheeled leg devices arranged at intervals in a front-rear direction, each set of wheeled leg devices including two wheeled leg devices arranged symmetrically in a left-right direction, the two wheeled leg devices being arranged on left and right sides of the body, respectively, each wheeled leg device including a leg assembly and a travel wheel, and a power output shaft of the leg assembly being connected to the travel wheel to drive the travel wheel to run; and a suspension device disposed in the body and connected to at least two sets from the plurality of sets of wheeled leg devices, wherein the at least two sets of wheeled leg devices are located at the foremost end and the backmost end respectively, the suspension device includes a plurality of drive assemblies, and each drive assembly is connected to a corresponding leg assembly to drive the leg assembly to be lifted or pressed down. Each drive assembly includes: an electric cylinder and a telescopic rod arranged on the electric cylinder, the electric cylinder being configured to drive the telescopic rod to extend or retract; a damper connected between the body and the leg assembly; and an elastic member fitted over the damper.

For the bionic robot for all terrains according to the embodiments of the present disclosure, since the suspension device is connected to at least two sets of wheeled leg devices at the foremost end and the backmost end selected from the plurality of sets of wheeled leg devices, when encountering obstacles, the leg assemblies can be lifted to cross the obstacles, which can improve the obstacle-crossing ability; moreover, the damper and the elastic member are connected between the body and the leg assembly, which can produce good shock-absorbing performance and make the bionic robot for all terrains run more smoothly and have strong adaptability to complex terrains.

According to an embodiment of the present disclosure, the extension of the telescopic rod can drive the leg assembly to be lifted, and the retraction of the telescopic rod can drive the leg assembly to be pressed down.

According to another embodiment of the present disclosure, the leg assembly includes: a motor provided with a power input shaft; a transmission shaft connected to the power input shaft to drive the transmission shaft to rotate; a power output shaft connected to the travel wheel to drive the travel wheel to rotate; a leg transmission assembly connected between the transmission shaft and the power output shaft. The leg transmission assembly includes: a first connection casing and a second connection casing connected and cooperating with each other, and defining a mounting cavity; and a transmission wheel set arranged in the mounting cavity to drive the power output shaft to rotate.

According to an optional embodiment of the present disclosure, the transmission wheel set includes a first pulley, a second pulley, and a drive belt; a radial size of the first pulley is smaller than a radial size of the second pulley; and the drive belt is connected between the first pulley and the second pulley, the first pulley is connected with the transmission shaft, and the second pulley is connected with the power output shaft.

According to another optional embodiment of the present disclosure, the travel wheel is provided with a coupler, and the power output shaft is connected to the travel wheel through the coupler.

According to another embodiment of the present disclosure, the plurality of sets of wheeled leg device include a first wheeled leg device, a second wheeled leg device, and a third wheeled leg device in sequence from front to rear; a leg assembly of the first wheeled leg device is inclined forward and arranged at a first angle with respect to a vertical direction; a leg assembly of the second wheeled leg device and a leg assembly of the third wheeled leg device are inclined backward and arranged at a second angle with respect to the vertical direction.

Further, the first angle is a1 and the second angled is a2, wherein $30°\leq a1\leq 90°$, and $90°\leq a2\leq 150°$.

According to yet another embodiment of the present disclosure, the body includes a housing defining a receiving cavity; a main controller arranged in the receiving cavity; an image collector and an image processor, wherein the image collector is connected to the image processor, and the image processor is connected to the main controller, the image collector collects environmental information and transmits the environmental information to the image processor for analysis and processing to convert the environmental information into corresponding instructions, and the image processor sends the instructions to the main controller; a wireless transceiver, wherein the main controller receives the instructions by the wireless transceiver; a waterproof sonar sensor, wherein the main controller collects a distance between the housing and obstacles around the housing by the waterproof sonar sensor; a gesture sensor, wherein the main controller collects gesture information by the gesture sensor, and analyzes and judges the gesture information to cross the obstacles actively; and a motor driving module and an execution motor module, wherein the main controller calculates the received instructions and sends a driving instruction to the motor driving module to drive the execution motor module to take a corresponding action.

Optionally, the housing is provided with a plurality of through-holes to mount the waterproof sonar sensor.

Optionally, baffles extending obliquely are provided at a front side and a rear side of the housing.

Additional aspects and advantages of the present disclosure will be presented in part in the following description, become apparent in part from the following description, or be learned from the practice of the present disclosure.

BRIEF DESCRIPTION OF THE DRAWINGS

The above and/or additional aspects and advantages of the present disclosure will become apparent and more readily appreciated from the following description of embodiments with reference to the drawings, in which.

Figure 1:
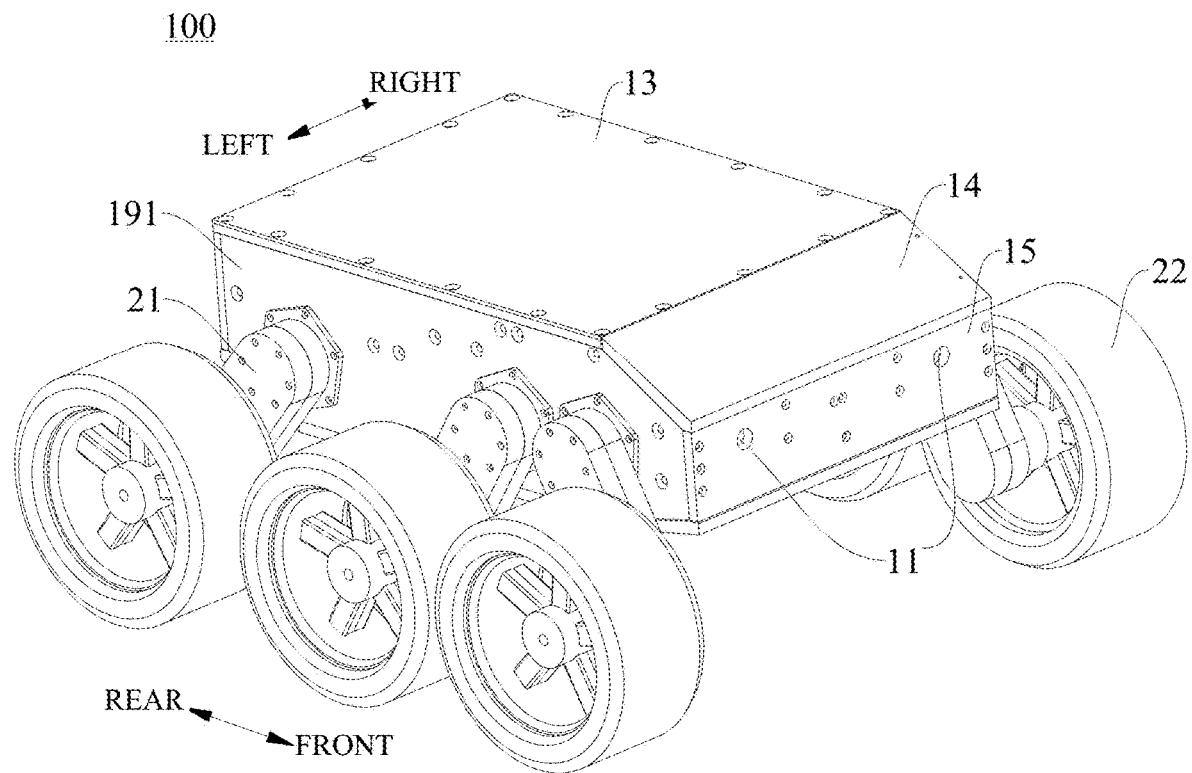
FIG. 1 is a perspective view of a bionic robot for all terrains according to an embodiment of the present disclosure.

REFERENCE NUMERALS bionic robot 100 for all terrains,
body 10, through-hole 11, inclined baffle 12, upper cover plate 13, front inclined baffle 14, front baffle 15, lower cover plate 16, rear baffle 17, rear inclined baffle 18, right support plate 19, left support plate 191,
wheeled leg device 20, leg assembly 21, motor 211, power input shaft 212, transmission shaft 213, power output shaft 214, leg transmission assembly 215, first connection casing 216, second connection casing 217, first fixing seat 218, second fixing seat 219, travel wheel 22, transmission wheel set 220, first pulley 221, second pulley 222, drive belt 223,
drive assembly 31, electric cylinder 311, telescopic rod 312, damper 313, elastic member 314.

DETAILED DESCRIPTION

Embodiments of the present application will be described in detail below, and the examples of the embodiments will be illustrated in the drawings. The same or similar elements and the elements having same or similar functions are denoted by like reference numerals throughout the description. The embodiments described herein with reference to the drawings are illustrative and used to generally understand the present disclosure. The embodiments shall not be constructed to limit the present disclosure.

In the description of the present disclosure, relative terms such as "central," "longitudinal," "lateral," "length," "width," "thickness," "upper," "lower," "front," "rear," "left," "right," "vertical," "horizontal," "top," "bottom," "inner," "outer," "axial," "radial," "circumferential" and the like should be constructed to refer to the orientation or position as then described or as shown in the drawings under discussion. These relative terms are for convenience and simplification of description and do not indicate or imply that the device or element referred to must have a particular orientation, or be constructed and operated in a particular orientation, so these terms shall not be construed to limit the present disclosure.

A bionic robot 100 for all terrains according to an embodiment of the present disclosure will be described with reference to FIGS. 1-8.

Figure 2:
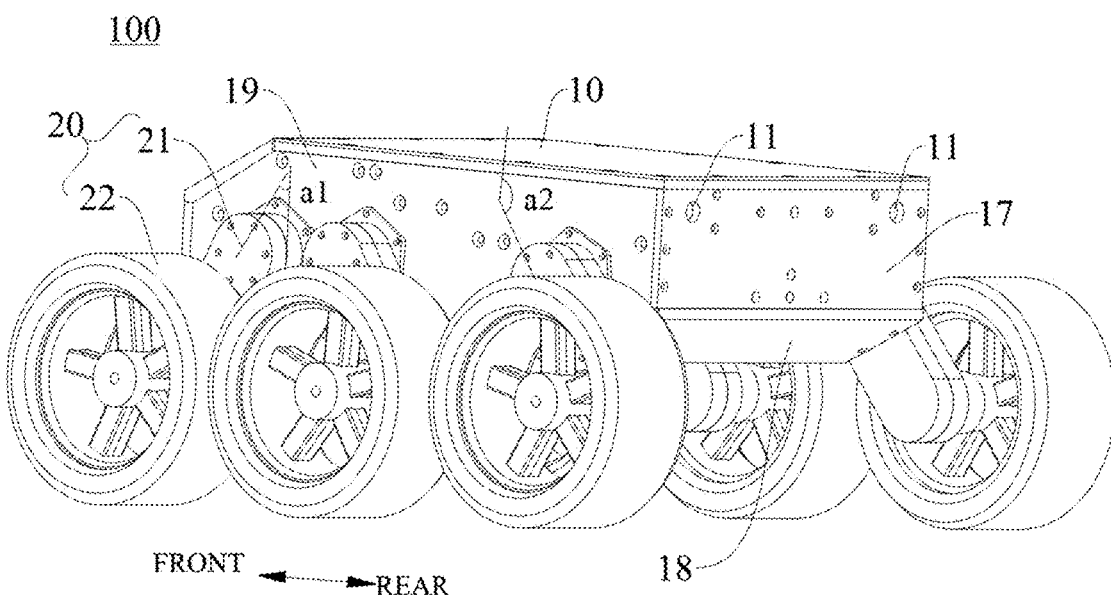
FIG. 2 is another perspective view of the bionic robot for all terrains according to the embodiment of the present disclosure.
Figure 3:
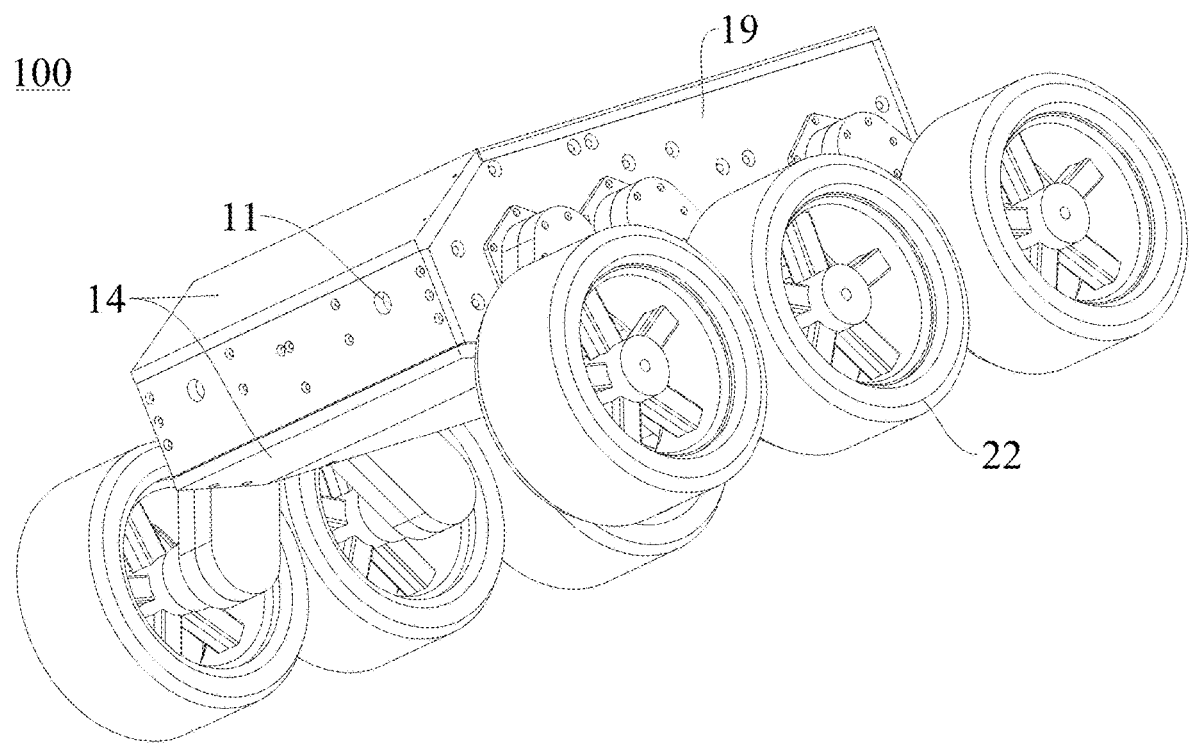
FIG. 3 is yet another perspective view of the bionic robot for all terrains according to the embodiment of the present disclosure.

As shown in FIGS. 1-3, the bionic robot 100 for all terrains according to the embodiment of the present disclosure includes a body 10, a plurality of sets of wheeled leg devices 20, and a suspension device.

The plurality of sets of wheeled leg devices 20 are arranged at intervals in a front-rear direction and can have a support function for the body 10. Each set of wheeled leg devices 20 includes two wheeled leg devices arranged symmetrically in a left-right direction, and the two wheeled leg devices 20 are arranged on left and right sides of the body 10, respectively. Each wheeled leg device 20 includes a leg assembly 21 and a travel wheel 22, and a power output shaft 214 of the leg assembly 21 is connected to the travel wheel 22 to drive the travel wheel 22 to run. The plurality of sets of wheeled leg devices 20 can support the body 10 and realize movement as a whole.

The suspension device is disposed in the body 10 and connected to at least two sets from the plurality of sets of wheeled leg devices 20, in which the at least two sets of wheeled leg devices 20 are located at the foremost end and the backmost end respectively, so that the wheeled leg devices 20 can be lifted or pressed down to realize an obstacle-crossing function, adapting to complex terrains, and at the same time, there will be a shock-absorbing effect, resulting in good motion stability.

Figure 6:
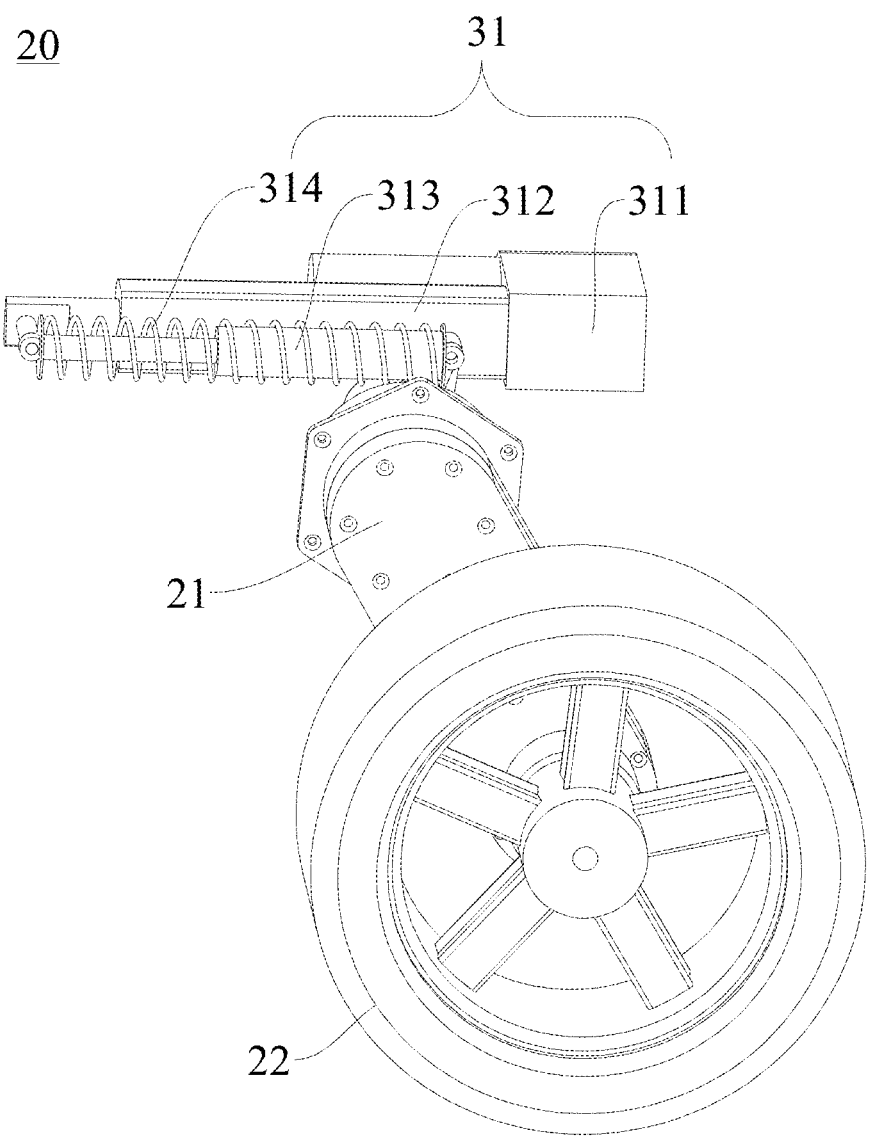
FIG. 6 is a perspective view of a suspension device and a wheeled leg device of the leg assembly of the bionic robot for all terrains according to the embodiment of the present disclosure.
Figure 7:
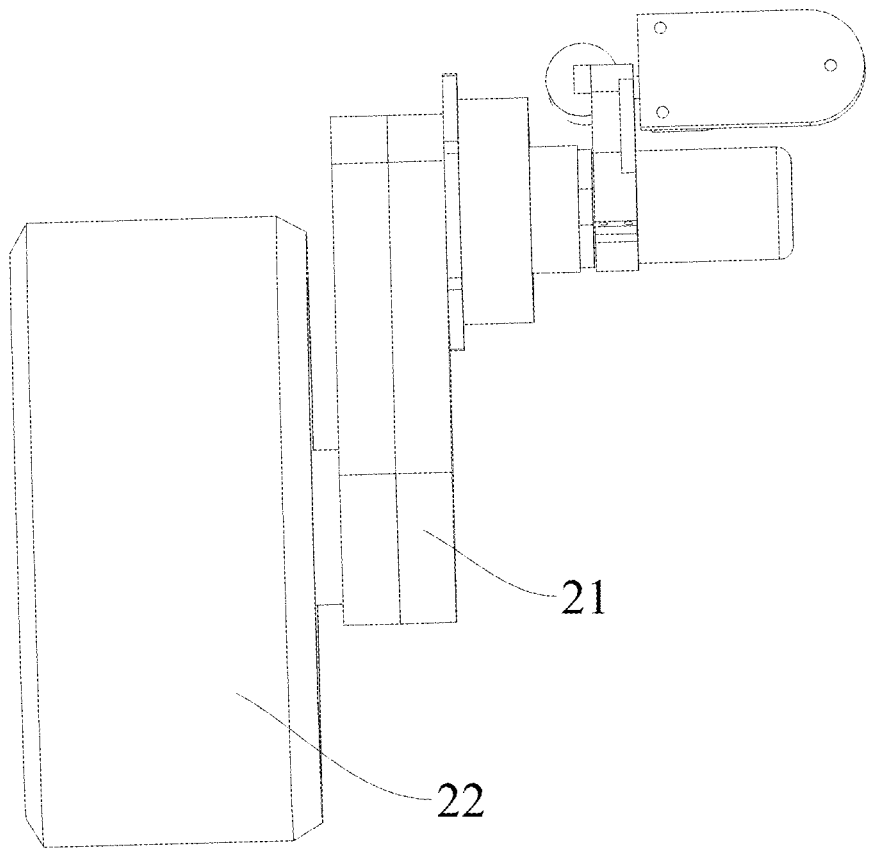
FIG. 7 is a side view of the suspension device and the wheeled leg device of the leg assembly of the bionic robot for all terrains according to the embodiment of the present disclosure.

As shown in FIG. 6, specifically, the suspension device includes a plurality of drive assemblies 31, and each drive assembly 31 is connected to a corresponding leg assembly 21 to drive the leg assembly 21 to be lifted or pressed down. Each drive assembly 31 includes an electric cylinder 311, a telescopic rod 312, a damper 313, and an elastic member 314. The telescopic rod 312 is arranged on the electric cylinder 311, and the electric cylinder 311 can drive the telescopic rod 312 to extend or retract and control a telescopic length of the telescopic rod 312 accurately. The extension or retraction of the telescopic rod 312 can drive the leg assembly 21 to be lifted or pressed down. For example, the extension of the telescopic rod 312 can drive the leg assembly to be lifted to cross the obstacles in front, and the retraction of the telescopic rod 312 can drive the leg assembly 21 to be pressed down to keep moving forward steadily.

Further, the damper 313 is connected between the body 10 and the leg assembly 21, and the elastic member 314 is fitted over the damper 313 to improve the shock-absorbing performance of the leg assembly 21 and the motion stability.

For the bionic robot 100 for all terrains according to the embodiment of the present disclosure, since the suspension device is connected to at least two sets of wheeled leg devices at the foremost end and the backmost end selected from the plurality of sets of wheeled leg devices 20, when encountering obstacles, the leg assemblies 21 can be lifted to cross the obstacles, which can improve the obstacle-crossing ability; moreover, the damper 313 and the elastic member 314 are connected between the body 10 and the leg assembly 21, which can produce good shock-absorbing performance and make the bionic robot for all terrains run more smoothly and have strong adaptability to complex terrains.

According to an embodiment of the present disclosure, the extension of the telescopic rod 312 can drive the leg assembly 21 to be lifted to cross the obstacles in front, and the retraction of the telescopic rod 312 can drive the leg assembly 21 to be pressed down to support the body 10 and keep moving forward. In such a way, the adaptability to complex terrains can be enhanced.

Figure 4:
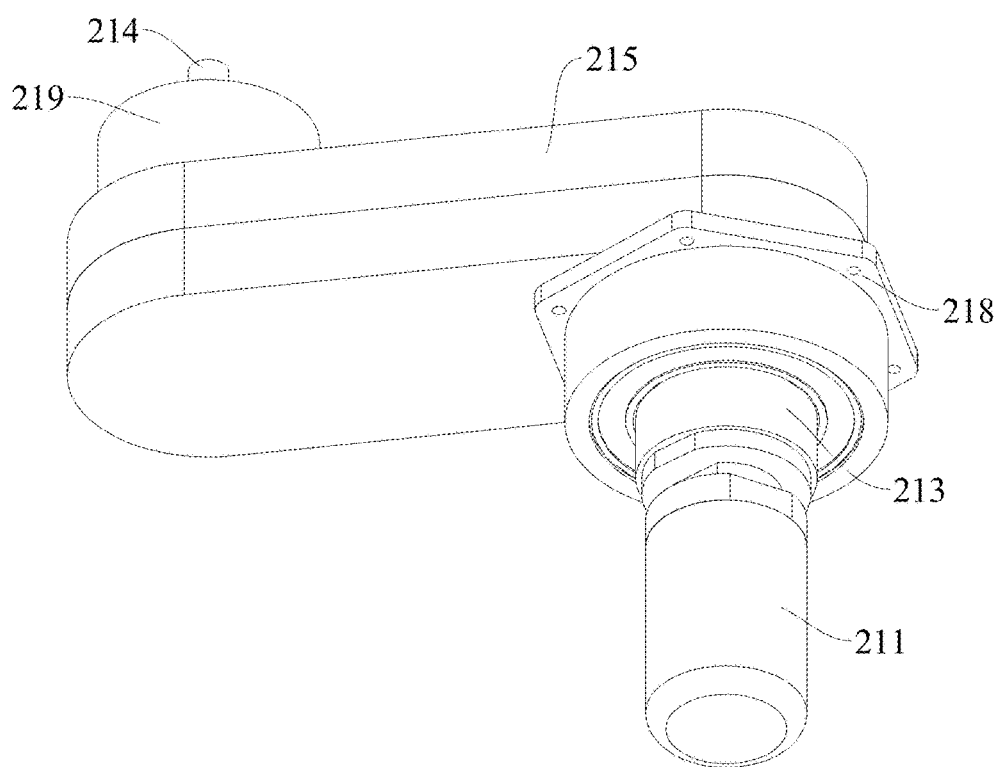
FIG. 4 is a perspective view of a leg assembly of the bionic robot for all terrains according to the embodiment of the present disclosure.
Figure 5:
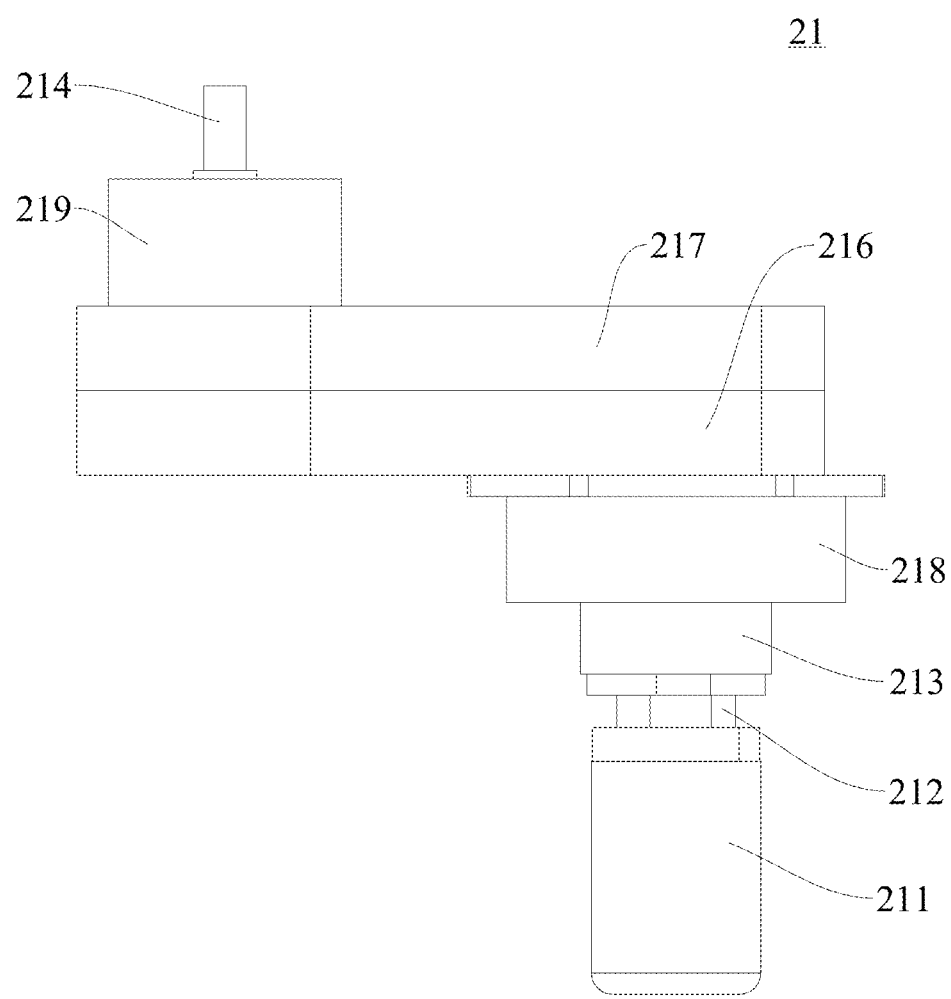
FIG. 5 is a side view of the leg assembly of the bionic robot for all terrains according to the embodiment of the present disclosure.

As shown in FIGS. 4 and 5, according to another embodiment of the present disclosure, the leg assembly 21 includes a motor 211, a transmission shaft 213, a power output shaft 214, and a leg transmission assembly 215. A power input shaft 212 is arranged on the motor 211, and the transmission shaft 213 is connected to the power input shaft 212 to drive the transmission shaft 213 to rotate. The power output shaft 214 is connected to the travel wheel 22 to drive the travel wheel 22 to rotate. The leg transmission assembly 215 is connected between the transmission shaft 213 and the power output shaft 214. The leg transmission assembly 215 includes a first connection casing 216, a second connection casing 217, and a transmission wheel set 220. The first connection casing 216 is connected to and cooperates with the second connection casing 217 to define a mounting cavity. The transmission wheel set 220 is arranged in the mounting cavity to drive the power output shaft 214 to rotate. Optionally, the motor 211 can be a DC brushless motor 211.

It can be understood that the leg transmission assembly 215 is connected between the power input shaft 212 and the power output shaft 214 to transmit power. An outer contour of the leg transmission assembly 215 is constructed into a structure with two arc-shaped ends and a long strip shape in the middle.

Further, the first connection casing 216 is oriented toward the power input shaft 212, and the second connection casing 217 is oriented toward the power output shaft 214. The power input shaft 212 and the transmission shaft 213 are connected to the leg transmission assembly 215 through first fixing seat 218, and the power output shaft 214 is connected to the leg transmission assembly 215 through the second fixing seat 219, so that the power input shaft 212 and the power output shaft 214 can cooperate with the leg transmission assembly 215 more reliably.

Figure 9:
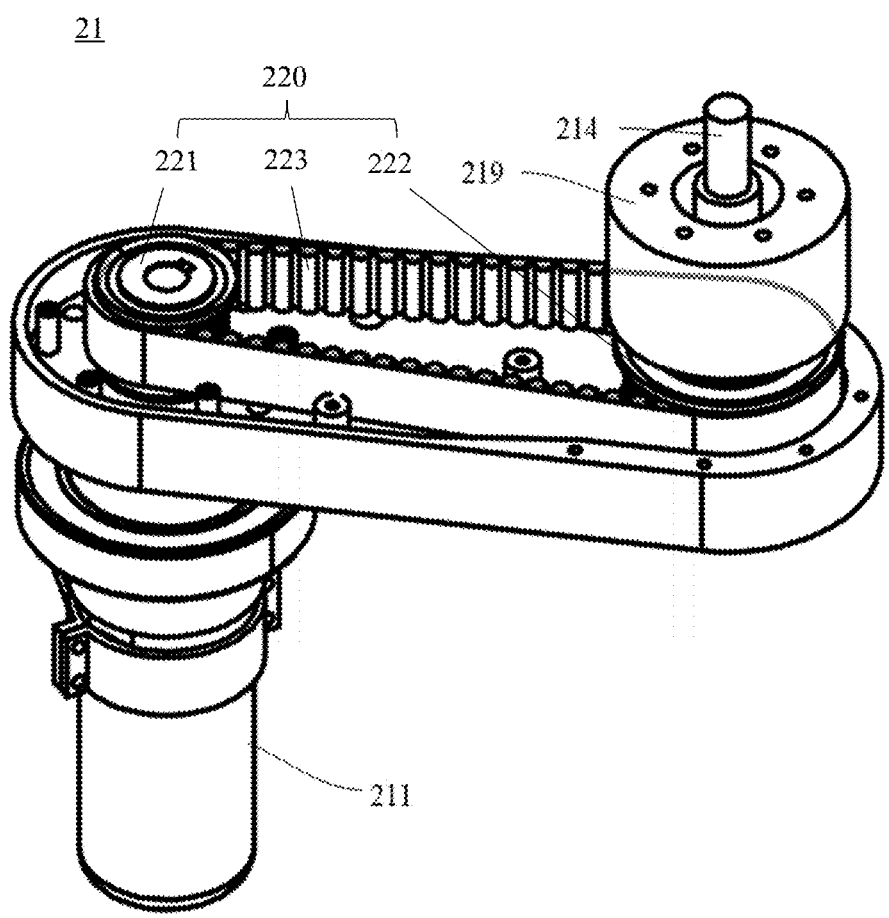
FIG. 9 is a perspective view of a leg assembly of the bionic robot for all terrains according to the embodiment of the present disclosure, showing a first pulley, a second pulley, and a drive belt of the transmission wheel set.

According to an optional embodiment of the present disclosure shown in FIG. 9, the transmission wheel set 220 includes a first pulley 221, a second pulley 222, and a drive belt 223. A radial size of the first pulley 221 is smaller than a radial size of the second pulley 222. The drive belt 223 is connected between the first pulley 221 and the second pulley 222, the first pulley 221 is connected with the transmission shaft 213, and the second pulley 222 is connected with the power output shaft 214, to realize a deceleration function. These components all adopt a mechanical transmission manner, and compared with a transmission manner with electrical constructions in the robots of the related art, the bionic robot of the present disclosure can travel through water and have a waterproof function.

According to another optional embodiment of the present disclosure, the travel wheel 22 is provided with a coupler, and the power output shaft 214 is connected to the travel wheel 22 through the coupler, which can make the connection more reliable, bear a large load, and have a greater load bearing function. Each travel wheel 22 adopts a tire with a width of 100 mm, which is suitable for various complex road conditions.

According to another optional embodiment of the present disclosure, the plurality of sets of wheeled leg device 20 include a first wheeled leg device 20, a second wheeled leg device 20, and a third wheeled leg device 20 in sequence from front to rear. A leg assembly 21 of the first wheeled leg device 20 is inclined forward and arranged at a first angle with respect to a vertical direction. A leg assembly 21 of the second wheeled leg device 20 and a leg assembly 21 of the third wheeled leg device 20 are each inclined backward and arranged at a second angle with respect to the vertical direction, so that the center of gravity of the whole structure is low and the motion stability is better.

Further, as shown in FIG. 2, the first angle is a1 and the second angle is a2, in which 30°≤a1≤90°, 90°≤a2≤150°. Also, a1 can be 30°, 60°, 80°, 90° and a2 can be 90°, 120°, 140°, 150°, and a1 and a2 can be designed according to actual needs. By limiting the first angle a1 and the second angle a2 within the above ranges, the center of gravity of the whole structure can be kept low, and the motion stability can be improved.

It should be further noted that, the design of the wheeled leg device 20 according to the embodiment of the present disclosure makes the center of gravity of the whole structure low and can bear heavy loads. When bearing a heavy load, the elastic member 314 is compressed, and the center of gravity of the body 10 drops, which can produce a shock-absorbing effect in the vertical direction.

Figure 8:
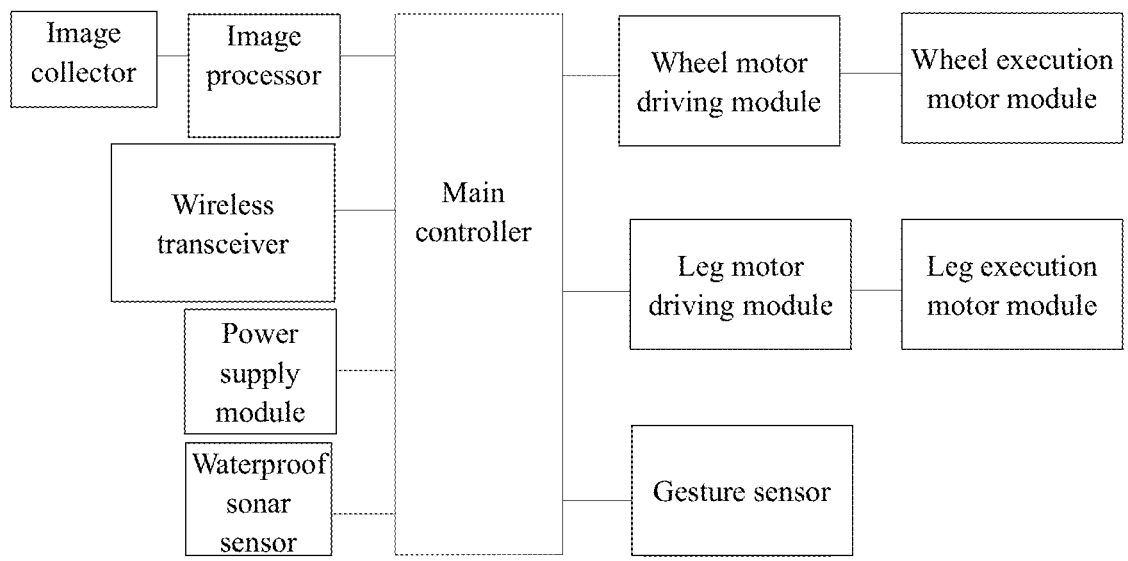
FIG. 8 is a schematic diagram of connection of various functional modules in a body of the bionic robot for all terrains according to the embodiment of the present disclosure.

As shown in FIG. 8, according to yet another embodiment of the present disclosure, the body 10 includes a housing, a main controller, an image collector, an image processor, a wireless transceiver, a waterproof sonar sensor, a gesture sensor, a motor driving module, and an execution motor module. The housing defines a receiving cavity, and the main controller is arranged in the receiving cavity. The image collector is connected to the image processor, and the image processor is connected to the main controller. The image collector collects environmental information and transmits the environmental information to the image processor for analysis and processing to convert the environmental information into corresponding instructions. The image processor sends the instructions to the main controller, and the main controller receives the instructions by the wireless transceiver that can use a 2.4G wireless transceiver.

Further, the main controller collects a distance between the housing and obstacles around the housing by the waterproof sonar sensor to realize an obstacle avoidance function. The main controller collects gesture information by the gesture sensor, and the main controller analyzes and judges the gesture information to cross the obstacles actively. The main controller calculates the received instructions and sends a driving instruction to the motor driving module to drive the execution motor module to take a corresponding action. It should be noted that the motor driving module includes a wheel motor driving module and a leg motor driving module, and the execution motor module includes a wheel execution motor module and a leg execution motor module, wherein the wheel motor driving module is connected between the wheel execution motor module and the main controller, and the leg motor driving module is connected between the leg execution motor module and the main controller.

It should be noted that the wheel execution motor module can control the rotation of the travel wheel 22, and the leg execution motor module can control the movement of the leg assembly 21.

Optionally, the body 10 is also provided with a power supply module to supply power to the above electrical functional modules.

Optionally, the housing is provided with a plurality of through-holes 11 for mounting the waterproof sonar sensor. In the description of the present disclosure, "a plurality of" means two or more than two.

As shown in FIGS. 1 to 3, optionally, baffles extending obliquely are provided at a front side and a rear side of the housing. The housing of the body 10 includes an upper cover plate 13, a front inclined baffle 14, a front baffle 15, a lower cover plate 16, a rear baffle 17, a rear inclined baffle 18, a right support plate 19, a left support plate 191, and three supporting beams. The supporting beams are located in the receiving cavity, and a left end and a right end of each supporting beam are provided with mounting holes. The body is designed to be axisymmetric—the shapes and thicknesses of the left support plate 191 and the right support plate 19 are the same, a position of a mounting hole in the left support plate 191 is the same as a position of a mounting hole in the right support plate 19, and the thicknesses of two front inclined baffles 14 (an upper inclined baffle and a lower inclined baffle) are the same.

Further, the body 10 has a waterproof grade of IP67 (abbreviation of the Ingress Protection Rating). The front baffle 15 and the rear battle 17 are each provided with two through-holes 11, and the through-hole 11 can have a diameter of 19 mm and be used to mount the waterproof sonar sensor. The junctions between the cover plates, the baffles, the inclined baffles, and the support plates are subject to glue filling to ensure the sealing performance.

As shown in FIGS. 1 to 3, six leg assemblies 21 are distributed on both sides of the body 10, and each side of the body 10 is provided with three leg assemblies 21. The six leg assemblies 21 are respectively fixed on the left support plate 191 and the right support plate 19, and fixation centers of the six leg assemblies are on a common horizontal plane. The sizes, shapes and dimensions of the six leg assemblies 21 are identical. It should be noted that at least four leg assemblies 21 can be ensured to work at the same time, enhancing the systematic stability, and when one or two leg assemblies 21 fail, the other leg assemblies can operate normally. Moreover, the dimensions, shapes and structural functions of the six leg assemblies 21 are the same, except that the installation directions thereof are different. The modular design is conducive to disassembly and replacement, increasing the systematic stability and reliability.

The bionic robot 100 for all terrains according to the embodiment of the present disclosure is an all-terrain robot 100 that can cross obstacles actively based on a crawling behavior of inchworms.

Six wheeled leg devices 20 of the bionic robot 100 for all terrains according to the embodiment of the present disclosure all adopt independent suspension, and can be driven independently, exhibiting excellent terrain adaptability and power output characteristics. Moreover, the suspension device arranged in the body 10 is driven by the electric cylinder 311, and can provide independent freedom of movement for each wheeled leg device 20, so that the leg assembly 21 can be lifted and pressed down actively, overcome obstacles with a height of 210-320 mm, and have a peristaltic walking function with a "wheel-leg combination". In addition, the topology of the housing of the body 10 can be optimized (studying some properties of geometric figures or spaces that can remain unchanged after continuous changes in shape, and only considering the positional relationship between objects without considering their shapes and sizes) to greatly reduce weight and improve passive obstacle-crossing performance under the premise of ensuring high stiffness and high strength of the components.

The front baffle and the rear baffle of the bionic robot 100 for all terrains according to the embodiment of the present disclosure are each provided with two high-precision waterproof sonar sensors for distance detection and collision avoidance detection. At the same time, the image collector is installed on the front side of the body 10, and may be a 5 megapixel autofocus HD camera. The image processor is used for real-time processing and recognition of collected images. When it is detected that a size of a front obstacle is equal to or less than 1.5 times a diameter or height of the travel wheel 22, the obstacle can be automatically crossed. When it is detected that the size of the front obstacle is greater than 1.5 times the diameter or height of the travel wheel 22, the bionic robot for all terrains 100 can automatically stop at a distance of 1 m away from the obstacle, and then bypass the obstacle.

Other components and operations of the bionic robot for all terrains 100 according to the embodiments of the present disclosure are known to those of ordinary skills in the art, and will not be described in detail here.

In the description of the present specification, reference throughout this specification to "an embodiment," "some embodiments," "an exemplary embodiment," "an example," "a specific example," or "some examples" means that a particular feature, structure, material, or characteristic described in connection with the embodiment or example is included in at least one embodiment or example of the present disclosure. In the specification, the appearances of the above-mentioned terms are not necessarily referring to the same embodiment or example of the present disclosure. Furthermore, the particular features, structures, materials, or characteristics may be combined in any suitable manner in one or more embodiments or examples.

Although embodiments of the present disclosure have been shown and described, it shall be appreciated by those skilled in the art that various changes, modifications, alternatives, and variations can be made in the embodiments without departing from principles and purposes of the present disclosure. The scope of the present disclosure is defined by claims or their equivalents.

What is claimed is:

1. A bionic robot for all terrains, comprising:
   a body;
   a plurality of sets of wheeled leg devices arranged at intervals in a front-rear direction, each set of wheeled leg devices comprising two wheeled leg devices arranged symmetrically in a left-right direction, the two wheeled leg devices being arranged on left and right sides of the body, respectively, each wheeled leg device comprising a leg assembly and a travel wheel, and a power output shaft of the leg assembly being connected to the travel wheel to drive the travel wheel to run; and
   a suspension device disposed in the body and connected to at least two sets from the plurality of sets of wheeled leg devices, wherein the at least two sets of wheeled leg devices are located at the foremost end and the backmost end respectively, the suspension device comprises a plurality of drive assemblies, and each drive assembly is connected to a corresponding leg assembly to drive the corresponding leg assembly to be lifted or pressed down, wherein each drive assembly comprises:
an electric cylinder and a telescopic rod arranged on the electric cylinder, the electric cylinder being configured to drive the telescopic rod to extend or retract;
a damper connected between the body and the leg assembly; and
an elastic member fitted over the damper,
wherein each leg assembly comprises:
a motor provided with a power input shaft;
a transmission shaft connected to the power input shaft to drive the transmission shaft to rotate;
a power output shaft connected to the travel wheel to drive the travel wheel to rotate;
a leg transmission assembly connected between the transmission shaft and the power output shaft, and comprising:
a first connection casing and a second connection casing connected and cooperating with each other, and defining a mounting cavity; and
a transmission wheel set arranged in the mounting cavity to drive the power output shaft to rotate,
wherein the plurality of sets of wheeled leg device comprise a first wheeled leg device, a second wheeled leg device, and a third wheeled leg device in sequence from front to rear; a leg assembly of the first wheeled leg device is inclined forward and arranged at a first angle with respect to a vertical direction; a leg assembly of the second wheeled leg device and a leg assembly of the third wheeled leg device are inclined backward and arranged at a second angle with respect to the vertical direction,
wherein the first angle is a1 and the second angle is a2, wherein $30°≤a1≤90°$, and $90°≤a2≤150°$,
wherein the transmission wheel set comprises a first pulley, a second pulley, and a drive belt; a radial size of the first pulley is smaller than a radial size of the second pulley; and the drive belt is connected between the first pulley and the second pulley, the first pulley is connected with the transmission shaft, and the second pulley is connected with the power output shaft, and
wherein the body comprises:
a housing defining a receiving cavity;
a main controller arranged in the receiving cavity;
an image collector and an image processor, wherein the image collector is connected to the image processor, and the image processor is connected to the main controller; the image collector collects environmental information and transmits the environmental information to the image processor for analysis and processing to convert the environmental information into corresponding instructions; and the image processor sends the instructions to the main controller;
a wireless transceiver, wherein the main controller receives the instructions by the wireless transceiver;
a waterproof sonar sensor, wherein the main controller collects a distance between the housing and obstacles around the housing by the waterproof sonar sensor;
a gesture sensor, wherein the main controller collects gesture information by the gesture sensor, and analyzes and judges the gesture information to cross the obstacles actively; and
a motor driving module and an execution motor module, wherein the main controller calculates the received instructions and sends a driving instruction to at least one of the drive assemblies to cause the electric cylinder to drive the telescopic rod to extend or retract or to at least one of the leg assemblies to cause the motor to drive the travel wheel to rotate.

2. The bionic robot for all terrains according to claim 1, wherein the extension of the telescopic rod can drive the leg assembly to be lifted, and the retraction of the telescopic rod can drive the leg assembly to be pressed down.

3. The bionic robot for all terrains according to claim 1, wherein the travel wheel is provided with a coupler, and the power output shaft is connected to the travel wheel through the coupler.

4. The bionic robot for all terrains according to claim 1, wherein the housing is provided with a plurality of through-holes to mount the waterproof sonar sensor.

5. The bionic robot for all terrains according to claim 1, wherein baffles extending obliquely are provided at a front side and a rear side of the housing.

* * * * *